United States Patent
Andersson et al.

(10) Patent No.: US 6,841,097 B2
(45) Date of Patent: Jan. 11, 2005

(54) METHOD OF PRODUCING POROUS SPHERICAL PARTICLES

(75) Inventors: Ralf Goran Andersson, Helsingborg (SE); Ingemar Jonsson, Helsingborg (SE)

(73) Assignee: Amersham Biosciences AB, Uppsala (SE)

( * ) Notice: Subject to any disclaimer, the term of this patent is extended or adjusted under 35 U.S.C. 154(b) by 311 days.

(21) Appl. No.: 10/148,718

(22) PCT Filed: Nov. 29, 2000

(86) PCT No.: PCT/SE00/02358

§ 371 (c)(1),
(2), (4) Date: Sep. 16, 2002

(87) PCT Pub. No.: WO01/40767

PCT Pub. Date: Jun. 7, 2001

(65) Prior Publication Data

US 2003/0052426 A1 Mar. 20, 2003

(30) Foreign Application Priority Data

Dec. 1, 1999 (SE) .............................. 9904344

(51) Int. Cl.[7] ................................. B29B 9/10
(52) U.S. Cl. ......................................... 264/5
(58) Field of Search .................................. 265/5, 8–14

(56) References Cited

U.S. PATENT DOCUMENTS 5,053,332 A  10/1991  Cook et al. .................. 435/178
5,662,840 A  * 9/1997  Thomas et al. ............... 264/12
6,248,268 B1 * 6/2001  Cook .......................... 264/12

FOREIGN PATENT DOCUMENTS

| DE | 4424998 A1 | 2/1996 |
| JP | 05179005 A | 7/1993 |
| WO | WO 88/07414 | * 10/1988 |
| WO | WO93/02785 A1 | 2/1993 |
| WO | WO95/20620 A1 | 8/1995 |
| WO | WO99/31141 A3 | 6/1999 |

* cited by examiner

Primary Examiner—Mary Lynn Theisen
(74) Attorney, Agent, or Firm—Royal N. Ronning, Jr.; Stephen G. Ryan; Yonggang Ji

(57) ABSTRACT

The invention refers to a method of controlling the porosity of porous spherical particles produced from a polysaccharide dissolved in a solvent, in which it can be gelled. The polysaccharide solution is finely divided by mechanical means into spherical droplets which are allowed to pass through a humid atmosphere and transferred to a capturing medium while controlling the temperature and humidity of humid atmosphere.

6 Claims, No Drawings

METHOD OF PRODUCING POROUS SPHERICAL PARTICLES

The present invention refers to a method of producing porous spherical gelled particles. More precisely, the invention refers to a method of controlling the porosity of porous spherical particles produced from a polysaccharide dissolved in a solvent, in which it can be gelled, said polysaccharide solution being finely divided by mechanical means into spherical droplets which are allowed to pass through a humid atmosphere and transferred to a capturing medium.

Gel filtration is a commonly used chromatographic separation method in which molecules are separated with respect to their size. Small molecules diffuse into porous particles while large molecules pass on the outside thereof. Spherical particles intended for the separation of macromolecules by means of such a chromatography are produced from a gelled and/or polymerized material. Of course, a good separation does not only depend on the size and the size distribution of the particles but also on the extent of the porosity of the particles.

In this connection the porosity of porous particles refers to the apparent size exclusion dimensions of a porous matrix as described by Hagel et al. ("Apparent Pore-Size Distributions of Chromatography Media", J. Chromatogr. 743(1): 33–42, 1996).

Porous matrices, which are used for gel filtration, can after one or several modifications with advantage also be used for other technologies including chromatographic separations. In these technologies, e.g. ion exchange chromatography (IEX), hydrophobic interaction chromatography (HIC), affinity chromatography, reversed phase chromatography etc, various interactions with direct and/or substituted ligand(s) on the gel are utilized, which are also highly dependent on the porosity. Such matrices can also be used for controlled release in connection with drug delivery.

Normally, these particles are produced by means of dispersion procedures which are based on a vigorous mechanical mixing of the generally water soluble substance which is to be dispersed in a dispersing medium usually comprising an organic solvent such as toluene. The processing of the spherical particles obtained from the dispersing procedure takes place in several steps accompanied by a thorough rinsing in order to remove the solvent. This conventional method of producing the particle shaped material for chromatography is thus energy demanding as well as expensive and, in addition, the productivity is low and produced batchwise.

One way of avoiding organic solvents when producing such particles would be to use water as a solvent in the manufacturing procedure. For example, a method for producing spherical alginate particles is shown in the publication WO 93/02785, the alginate solution being finely divided into droplets which are allowed to fall freely through the air down into an ionic solution in which they are hardened.

In experiments of producing particles from water soluble polysaccharides attempts have been made to allow droplets of a polysaccharide solution to gel directly into particles in water of 0–25° C. The results obtained in this connection have, however, not been satisfactory with reference to such problems as shape, gel concentration and surface face properties.

It is thus important that droplets of uniform size are produced. In WO 95/20620 spherical gel particles for chromatographic use are produced by mechanical disintegration of a gelling liquid polymer and transport of the particles through a gas to a solvent. In this way, particles are produced without the use of the solvents needed for an emulsion polymerization process, and the process yields particles of narrower size distribution.

The problem of water solubility during the collection in water of spherical particles produced from agarose has been avoided in U.S. Pat. No. 5,053,332 by allowing the droplets—until they are gelled—to fall through and remain suspended in an upward flowing cooling gas which is inert to agarose. Such a procedure has a desiccating effect on the particles.

The purpose of the invention is to avoid the above-mentioned drawbacks of the known technique by producing an improved porous spherical material which preferably is intended for chromatography.

For water soluble polymeric materials the high Is demands that organic solvents must not be present in the material intended for chromatography are eliminated by the invention. Furthermore, new processes are obtained by the invention, in which organic solvents can be avoided, an aspect which is important from an environmental point of view.

More specifically, the invention refers to a method of producing porous spherical particles from a polysaccharide in solution, which can be gelled and/or polymerized, the polysaccharide solution being finely divided by mechanical means into spherical droplets. The droplets are allowed to pass through a controlled atmosphere, and the finely divided material formed is then allowed to pass (e.g. fall down) into a capturing medium. In this way, spherical particles having a narrow particle size distribution can be continuously produced from a polysaccharide.

Such particles can for example be achieved with the device described in WO 88/07414. With this system, droplets having a diameter of 20–500 $\mu$m can be produced.

The method according to the invention is based on the fact that when a polysaccharide, which can be gelled, is formed into a droplet, the droplet under certain circumstances is gelled into a three dimensional lattice enclosing a solvent in such a way that a pseudosolid material is formed. Thus, the molecular structure in the droplet formed has— from the very beginning—defined the maximal porosity of a future particle. The structure determining the maximal porosity is initially created in a droplet and the final pore formation is the result of a combination with a subsequent partly irreversible evaporation and desiccation process.

Accordingly, it is very important that the pore formation in the droplets takes place under controlled conditions during the gelling of the polysaccharide. If the evaporation or the desiccation is too extensive, the surface of the future particles will dry and an irregular surface will be obtained the porosity at the same time being considerably affected. The risk of an uncontrolled desiccation increases when a smaller particle size is contemplated.

The controlled atmosphere is according to the invention a humid atmosphere, the temperature and humidity of which is controlled. Porous spherical particles of retained or increased porosity are obtained after a conveyance through an atmosphere, which thus consists of a varying mixture of air and water in gaseous phase or water vapor only. The atmosphere used is also controlled by its temperature. A temperature gradient will inevitably be obtained, but it can be controlled. Preferably, the temperature gradient is controlled to be as smooth as possible from the site of droplet formation to the capturing medium.

After this controlled conveyance through a humid atmosphere, the polysaccharide droplets are captured. In the capturing medium, the gelling of the droplets/particles is completed. Preferably, the capturing medium comprises water, but it can also be an organic solvent e.g. toluene, when a low surface tension is of importance for the manufacturing of completely spherical particles.

The porous spherical particles formed can then be separated by means of filtration or sedimentation.

The droplets from a particle generating apparatus contain a polysaccharide solution, which can be gelled, and the gelling may or may not be continues during the conveyance through the controlled atmosphere. Thus, the temperature of the humid atmosphere is higher than the gelling temperature of the polysaccharide. The controlled atmosphere can be of the same temperature as the environment, for example room temperature, but higher as well as lower temperatures may be used in dependence of the application contemplated. Accordingly, the polymerization of a material, which can be gelled, can also be controlled to take place during the conveyance through the controlled atmosphere. The residence time in this atmosphere is usually less than about 30 seconds, but can of course be varied.

This procedure results in that the surface porosity of the newly formed particles is maintained throughout the gelling stage. In this connection, a desiccation of the particle surface is avoided during the gelling, which would result in an extensive reduction of the porosity.

In principle, the polysaccharide used for exercising the method according to the invention can be any naturally occurring polysaccharide. Preferably, the polysaccharide is agarose, agar, starch, or alginate.

The polysaccharide is dissolved in a solvent comprising water. If the gelling polysaccharide is agarose, it is made as water solution of 2–14 weight %. In this case, the gelling process takes place at a high relative humidity and at a high temperature. Preferably, the cooling of the droplet takes place in a water vapor (100% relative humidity). The droplets obtained are conveyed to a capturing medium through an atmosphere controlled with respect to humidity and temperature, which preferably consists of a mixture of air and water vapor, alternatively water vapor only. During the conveyance, the droplets are subjected to a temperature gradient, preferably between 100° C. and 20° C., the steepness of which can be controlled. The final gelling can also be achieved in the capturing medium.

The polysaccharide gel solution as well as the aqueous capturing medium can advantageously also contain additives affecting the gelling, such as salts etc. Since the polysaccharide is substantially soluble in water, a complete gelling at low temperature can be effected in the aqueous capturing medium. The capturing medium can also contain a surface tension reducing agent in order to facilitate the transport through the surface of the medium.

EXAMPLES

The following non-limiting examples will now be given in order to further describe the invention.

Example 1

Agarose was dissolved to 4 weight % in boiling water, and the solution was then allowed to cool to 90° C. while stirring. At this temperature the agarose solution obtained was finely divided into spherical droplets of 100 $\mu$m±25 $\mu$m by means of the device described in WO 88/07414. Then, for about 30 seconds the spherical droplets obtained were allowed to fall through a zone of water vapor/air of a high moisture content (50–100%) and temperature (20–100° C.). The particles were then allowed to fall down into a tank containing water of room temperature, the particles being completely gelled therein. The preparation of one separate batch for chromatography results in a particle size distribution of more than 80% of the material within ±25% of the mean particle size.

Example 2

Agarose particles were produced by dispersing 6.6 g of agarose powder to 100 ml of water having a temperature of about 30° C. The agarose powder suspension was then completely dissolved with stirring in a microwave oven at about 96° C.

The gel solution obtained was sprayed by means of a rotating disk into individual droplets, as shown in WO 88/07414. The droplets formed were caught in water, which resulted particles having a diameter of 100 $\mu$m±10% and a dry weight of about 6% (w/v).

Before being captured, the droplets formed by the rotating disk were allowed to pass through a controlled atmosphere according to the invention. This was accomplished by arranging a dome over the spinning disk and controlling temperature and humidity underneath to be 50° C. and 100%, respectively.

As a comparison, the droplets formed were allowed to pass normal room atmospheric conditions, i.e. a temperature of 20° C. and a humidity of 55%.

The porosities of the particles formed were compared after passage through the different atmospheres and transfer to a capturing medium. This was performed in column (Ø=10×h=300 mm) which was equilibrated and eluted with 25 mM Tris-HCl, pH 7.0, and 100 mM KCl at a rate of 15 ml/h. The column was loaded with different substances of known molecular weights. Any appearance of a substance after the void volume was noted (Yes), which indicated diffusion of he substance into the porous spherical particles. The results are given in Table 1 below.

TABLE 1

| Substance | Mw (D) | Comparison | Invention |
|---|---|---|---|
| Thyroglob. | 669 000 | 0 | Yes |
| Ferritin | 440 000 | 0 | Yes |
| Catalase | 232 000 | Yes | Yes |
| Aldolase | 158 000 | Yes | Yes |

The results show that particles produced according to the invention have porosities that allow diffusion of substances of very large molecular weights, up to more than 650 000 Dalton. Particles under normal atmospheric conditions resulted in less porous particles. They only allow diffusion of considerably smaller substances, i.e. less than 250 000 Dalton. Consequently, particles produced according to the invention demonstrate increased porosity.

What is claimed is:

1. In a method of controlling the porosity of porous spherical particles produced from a polysaccharide dissolved in a solvent including water, wherein the polysaccharide solution is finely divided by mechanical means into spherical droplets and transferred to a capturing medium, the improvement comprising conveying said droplets through a humid atmosphere, wherein the temperature and, humidity of said atmosphere are controlled.

2. The method of claim 1, wherein said temperature and/or said humidity of said atmosphere is set above ambient temperature and/or humidity, and said porosity is retained or increased.

3. The method of claim 2, wherein the temperature of said capturing medium is brought below that of the gelling temperature of the polysaccharide.

4. The method of claim 1, wherein said capturing medium comprises water.

5. The method of claim 1, wherein said polysaccharide is selected from the group comprising agarose, cellulose, starch, and alginate.

6. The method of claim 5, wherein said polysaccharide is agarose and is dissolved as a 2–14 weight % water solution.

* * * * *